United States Patent [19]

Aritsuka

[11] Patent Number: 5,510,337

[45] Date of Patent: Apr. 23, 1996

[54] AGENTS FOR SUPPRESSION OR LOWERING OF BLOOD LIPIDS

[75] Inventor: Tsutomu Aritsuka, Hokkaido, Japan

[73] Assignee: Nippon Tensaiseito Kabushiki Kaisha, Tokyo, Japan

[21] Appl. No.: 336,757

[22] Filed: Nov. 8, 1994

Related U.S. Application Data

[63] Continuation of Ser. No. 106,636, Aug. 16, 1993, abandoned.

[30] Foreign Application Priority Data

Sep. 8, 1992 [JP] Japan .................................... 4-264158
Jun. 1, 1993 [JP] Japan .................................... 5-152606

[51] Int. Cl.⁶ .................................................. A61K 35/78
[52] U.S. Cl. .......................... 514/57; 424/195.1; 514/824; 514/724
[58] Field of Search ........................... 514/57, 724, 824; 424/195.1

[56] References Cited

U.S. PATENT DOCUMENTS 5,248,502  9/1993  Ndife ...................................... 514/885

FOREIGN PATENT DOCUMENTS

| | | |
|---|---|---|
| 089056 | 9/1983 | European Pat. Off. ........... A23L 1/34 |
| 166824 | 1/1986 | European Pat. Off. ......... A23L 1/318 |
| 401117 | 12/1990 | European Pat. Off. .......... A23L 1/10 |
| 419359 | 3/1991 | European Pat. Off. ........ A23L 1/368 |
| 431650 | 6/1991 | European Pat. Off. ....... A61K 35/78 |
| 474230 | 3/1992 | European Pat. Off. .......... A23L 1/308 |
| 63-216822 | 9/1988 | Japan ............................. A61K 31/715 |
| WO92/08367 | 5/1992 | WIPO . |
| WO93/08814 | 6/1993 | WIPO . |
| WO93/16605 | 9/1993 | WIPO . |
| WO93/17586 | 9/1993 | WIPO . |
| WO93/23060 | 11/1993 | WIPO . |

OTHER PUBLICATIONS

Japan Journal of Nutrition and Food Academy, vol. 42, No. 4, pp. 295–304, 1989.
Journal of Agricultural Chemistry Academy, vol. 66, No. 5, pp. 881–889, 1992.
Tsuji, "Non–nutrients and Organic Functions", p. 36, 1987 (verified translation enclosed).
Handbook of Dietary Fiber, pp. 22–24, 32–34 & 305308, Jul. 16, 1992.
Aritsuka et al., Effect of Beet Dietary Fiber on Lipid Metabolism in Rats Fed a Cholesterol–free Diet in Comparison with Pectin and Cellulose, 1989, 295–304.
Aritsuka et al., Long–term Effects on Serum Cholesterol Concentration of Beet Dietary Fiber in Normal and Cecectomized Rats Fed a Cholesterol–free Casein Diet, 1992, 881–889.
Artitsuka et al., Effects of Chemically Modified Beet Dietary Fiber on Lipid Metabolism in Rats Fed a Cholesterol–Free Diet, 1994, 223–231.
Fukuba et al., Effect of Lignin and Its Related Components on Plasma Cholesterol Level, 1989, 449–459.
O. D. Rotstein et al., "Prevention of Cholesterol Gallstones by Lignin and Lactulose in the Hamster", Gastroenterology, vol. 81, 1098–1103 (1981).

*Primary Examiner*—Ronald W. Griffin
*Attorney, Agent, or Firm*—Burns, Doane, Swecker & Mathis

[57] ABSTRACT

The present invention relates to an agent for the suppression or lowering of blood lipids, cholesterol and neutral fats, which is derived from a plant and comprises, as an effective ingredient, an edible dietary fiber which contains cellulose and lignin as its main constituents and maintains the cellulose and lignin in a bonded state as in the plant.

10 Claims, No Drawings

5,510,337

AGENTS FOR SUPPRESSION OR LOWERING OF BLOOD LIPIDS

This application is a continuation of application No. 08/106,636, filed Aug. 16, 1993, now abandoned.

BACKGROUND OF THE INVENTION

1. Field of the Invention

The present invention relates to an agent for the suppression or lowering of blood lipids as well as cholesterol and neutral fats which comprises, as an effective ingredient, an edible dietary fiber having a effect of suppressing or lowering blood lipids, as well as cholesterol and neutral fats.

2. Prior Art

An abundance of epidemiologic research has confirmed that high levels of blood lipids in humans raises the rate of incidence of atherosclerosis and ischemic heart disease. In addition, it is thought that very many dietary factors influence blood lipids, involving the quantitative and qualitative changes of almost all nutrients.

In recent years, the continued Westernization of the daily diet in this country has been accompanied by an increase in adult diseases, while much has been said about the importance of dietary fiber in the relationship between diet and epidemic diseases. Also, an immense amount of epidemiologic and experimental research regarding dietary fiber has proven that it is an important dietary ingredient with a strong influence on blood lipids.

However, in laboratory reports so far, the general explanation has been that, of the dietary fibers, water soluble dietary fibers such as pectin, guar gum, gum Arabic, konjak mannan, etc. have a normalizing effect on blood lipids, and particularly cholesterol, while water insoluble dietary fiber sources such as wood cellulose, wheat bran, soybean fiber, etc. have no such effect (Keisuke Tsuji: "Non-nutrients and organic functions," ed. by Akira Yoshida, Etsuro Sugimoto, Kouseikan, p. 36, 1987). Also, the exertion of the effects of these water soluble dietary fibers is due to their effect of promoting the excretion of cholesterol into the feces.

On the other hand, there are also numerous reports regarding the blood lipid-lowering effect of water insoluble dietary fibers as well, and we the present inventors have already provided a report regarding the effect of beet fiber that means dietary fiber made from sugar beet (Japan Journal of Nutrition and Food Academy, 42, 295, 1989; Japan Journal of Agricultural Chemistry Academy, 66, 88, 1992; Japanese Patent Application SHO 62-49991).

Thus, at the present time there is an inundation of reports relating to dietary fibers, some stating the presence and others stating the absence of blood lipid-regulating effects. This may be due to the fact that there is no agreement between methods of investigation and testing, and that the majority of reports until now are concerned with the case of using purified dietary fibers isolated from plants, and also that dietary fibers encompass many and varied substances, each with unique physical and chemical properties which are closely related to the type of physiological effect and action of the dietary fiber.

However, in actual daily life, dietary fiber is not isolated and purified, but is ingested as complexes of various dietary fibers, in the form of vegetables, fruit, beans, grains and seaplants. Furthermore, since these complexes are what is traditionally meant by dietary fiber, it is important to determine the relationship between them and each fiber for the total properties and their physiological effects, though this is considered a difficult thing to do.

The various dietary fiber sources have different origins, and therefore they would be expected to each have their unique nutritional physiological effects; however, based on the fact that they are composed of common dietary fiber ingredients, we the present inventors wondered if these or other plant-derived dietary fiber sources might also have common suppressing or lowering effects on blood lipids, cholesterol and neutral fats.

SUMMARY OF THE INVENTION

The present inventor, as a result of diligent research regarding the above topic, has unexpectedly discovered that the above effects are possessed by cellulose and lignin, both of which are water insoluble dietary fibers from dietary fiber sources derived from plants, and that the effects require that cellulose and lignin maintain their bonded state as in the plants.

The first aspect of the present invention is an agent for the suppression or lowering of blood lipids, cholesterol and neutral fats, which is derived from a plant and which comprises, as an effective ingredient, an edible dietary fiber which contains cellulose and lignin as its main constituents and maintains the cellulose and lignin in a bonded state as in the plant.

The second aspect of the present invention is an agent for the suppression or lowering of blood lipids, cholesterol or neutral fats, which is produced by treating a dietary fiber source derived from a plant with an alkali or an acid, and neutralizing it if necessary, and which comprises, as an effective ingredient, an edible dietary fiber which contains cellulose and lignin as its main constituents and maintains the cellulose and lignin in a bonded state as in the plant.

Also, according to the present invention, the content of the cellulose and lignin in the edible dietary fiber which are maintained in a bonded state as in the plant is preferably 50% or more in the agent for the suppression or lowering of blood lipids, cholesterol or neutral fats.

DETAILED DESCRIPTION OF THE INVENTION

The dietary fiber source for obtaining the effective ingredient according to the present invention may be practically any plant, since practically all plants store cellulose-lignin bonded compounds. Although dietary fiber sources obtained from practically any plant may be used, the dietary fiber must be edible (in a state which may be safely eaten by humans) while maintaining cellulose and lignin, which were separated by treatment with an alkali or acid, in a bonded state as in the plant.

Of the plants available for use, including those shown in Table 1, grains such as rice, wheat, oats, corn, soybean,

TABLE 1

Dietary fiber ingredients of dietary fiber sources derived from edible plants (%)

| Dietary fiber source | Water insoluble dietary fiber | | Water soluble dietary fiber | | Total dietary fiber | Non-dietary, fibrous ingredients |
| --- | --- | --- | --- | --- | --- | --- |
| | Cellulose | Lignin | Hemicellulose | Pectin | | |
| Defatted rice bran | 9 | 3 | 26 | — | 38 | 62 |
| Wheat bran | 10 | 3 | 32 | — | 45 | 55 |
| Oats bran | 6 | 2 | 13 | — | 21 | 79 |
| Corn bran | 9 | 7 | 41 | — | 57 | 43 |
| Soybean fiber | 9 | 1 | 21 | 4 | 35 | 65 |
| Apple fiber | 27 | 2 | 18 | 11 | 58 | 42 |
| Beet fiber | 23 | 3 | 37 | 19 | 82 | 18 |

No. 1: Dietary fiber sources are air-dried.
No. 2 Cellulose, lignin and hemicellulose were assayed by the Van Soest method, and pectin by the hexametaphosphate extraction method, and the totals thereof were listed as the total dietary fiber content (%).

etc., apples, tangerines, bananas and other fruit, beets, spinach, celery, Chinese cabbage and other vegetables, shiitake and other mushrooms, mugwort, osmund and other wild plants, dandelions and other grasses, as well as smaller plants, larger plants and most other plants, practically all have portions containing cellulose and lignin, and thus they all contain the effective ingredients according to the present invention, and may be used effectively.

In the Table 1, the % sign indicates percentage by weight, as do all of the % signs in this specification.

According to the present invention, the dominant dietary fiber portion may be separated, fractionated, etc. from the majority of these plants, and used as the crude substance.

The crude substance from dietary fiber sources may be defatted rice bran, wheat bran, oat bran, corn bran, soybean fiber, apple fiber and beet fiber, as shown in Table 1.

The Van Soest method (J. Assoc. Off. Anal. Chem., 46, 829, 1963) is already known as a technique for treating crude substances from dietary fiber sources with an acidic detergent solution and assaying the content of cellulose and lignin.

However, it has not been known at all prior the present invention that the cellulose and lignin obtained according to the above mentioned assay technique maintain their bonded state as in the plant, and have a suppressing or lowering effect on blood lipida, cholesterol and neutral fats.

Furthermore, the substances obtained by the publicly known Van Soest method have not been in any way considered for ingestion by humans, since acidic detergents are publicly not approved as food additives.

According to the present invention, a dietary fiber source derived from plants is treated with an alkali or acid, and neutralized, washed with water, dehydrated and dried if necessary for completion, and then may be safely ingested by humans.

The alkali or acid to be used according to the present invention is, of course, edible, and may include any alkali or acid which becomes edible and publicly approvable upon neutralization and washing with water.

The alkali may be caustic soda, caustic potash, ammonia, ammonium hydroxide, sodium carbonate or the like, and the acid may be an inorganic acid such as hydrochloric acid, sulfuric acid, etc. or an organic acid such as lactic acid, citric acid, etc. The treatment time depends on the type and concentration thereof, but treatment is continued until practically all of the water soluble dietary fiber ingredients and non-dietary fiber ingredients are removed. During this treatment, careful attention must be given to the concentration of the alkali or acid, the treatment temperature, the stirring conditions, the treatment time, etc., depending on the crude substance of the dietary fiber source, so that the bonds of cellulose and lignin in the plant are not broken. For example, for wheat bran powder, treatment must be effected using 0.5N caustic soda at 50° C. while stirring for 24 hours. Also, for oat bran powder, treatment must be effected using 0.5N sulfuric acid at 70° C. while stirring only slightly for 30 minutes.

The alkali-treated or acid-treated substance is neutralized if necessary, but if a diluted alkali or acid solution or a weak alkali or acid solution and organic matter, etc. are used, there is often no need for neutralization, and in such cases simple washing with water is adequate.

The water-washed substance may or may not be dried, and it will consist primarily of cellulose and lignin, although if possible, most of this is preferably maintained in a bonded state as in the plant.

However, the possibility exists that the bonds of cellulose and lignin in the plant may be broken by the processes of separation of the dietary fiber source from the plant, treatment with an alkali or acid, thermal treatment, stirring, neutralization, washing with water, dehydration, drying, etc.

According to the present invention, the edible dietary fiber in which cellulose and lignin are maintained in a bonded state as in the plant is preferably 50% or greater, more preferably 70% or greater, still more preferably 80% or greater, and most preferably 90% or greater.

An agent for the suppression or lowering of blood lipids, cholesterol and neutral fats according to the present invention is obtained with a dietary fiber source derived from plants as the starting material, and as shown in Table 1, the dietary fiber sources derived from plants contain water insoluble dietary fiber (cellulose, lignin) and water soluble dietary fiber (hemicellulose, pectin) as the dietary fiber ingredients, though with differences in the content. Also, regarding these dietary fiber sources derived from the plants, as a result of research using experimental animals to determine whether or not they possess ingredients with lowering effects on cholesterol, etc., it has been found that dietary fiber sources derived from plants, which have as their major constituents cellulose and lignin maintained in a bonded state, exhibit very strong effects of cholesterol lowering, etc.

An explanation will now be given regarding some experiments conducted using rats as the experimental animals. In order to approximate the dietary conditions of humans, the basic feed supplied to the rats had no cholesterol or cholic acid, and the proportions of components constructed the basic feed supplied were as shown in Table 2.

TABLE 2

Proportions of components constructed basic feed supplied

| Composition | Stirring ratio (%) |
| --- | --- |
| Milk casein | 25 |
| Corn oil | 5 |

TABLE 2-continued

| Proportions of components constructed basic feed supplied | |
|---|---|
| Composition | Stirring ratio (%) |
| Mineral compound[1] | 4 |
| Vitamin compound[2] | 1 |
| Choline chloride | 0.2 |
| Vitamin E granules[3] | 0.1 |
| Sugar | 64.7 |

Note:
[1]Harper's mineral mixture
[2]harper's vitamin mixture
[3]Product of Eizai Co.

The experiment was conducted with seven young 4 to 5-week-old rats per group, forming a control group to which the basic feed was supplied, and a test group to which a feed was supplied which consisted of the basic feed plus 0.3%–10% of the dietary fiber source or dietary fiber. During growth, the feed and water were supplied normally with no particular restrictions, and at the 6th and 12th weeks after of the experiment, blood was taken from the caudal vein, and the serum cholesterol and neutral fat contents were determined. Also, on the 12th week the livers were extracted, and the total liver lipid and cholesterol contents were determined.

Experiment 1

Wheat bran was treated with an acidic detergent solution, based on the Van Soest method (J. Assoc. Off. Anal. Chem., 46, 829, 1963) to obtain acidic detergent fiber (cellulose+lignin, hereunder abbreviated to ADF) (13% yield), and the results of investigation of the influence of this wheat bran and the wheat bran-derived ADF on lipid metabolism are shown in Table 3.

bran-derived ADF-added group shows a considerable decreasing effect on blood lipids despite the lower amount of addition, and the effect is continuous. The total liver lipid and cholesterol contents, similar to the blood lipids, also show a considerable suppressing effect on total lipid accumulation in the liver for the 2% wheat bran-derived ADF-added group.

The above mentioned results are phenomena which have not been reported until now, and they suggest that wheat bran-derived ADF has a blood lipid-regulating effect, while the ingredients other than the wheat bran-derived ADF (water soluble dietary fiber, non-dietary fiber ingredients) are minus factors inhibiting the blood lipid-regulating effect inherent in wheat bran-derived ADF.

Experiment 2

Dietary fiber-rich beet fiber (hereunder abbreviated to BDF) was used, and the water soluble dietary fiber (hemicellulose, pectin) and ADF were fractionated from the BDF. Also, cellulose and lignin were each isolated from a portion of the ADF. Each of the above mentioned ingredients was added to the basic feed (Table 2) based on the constituent dietary fiber content of BDF (Table 1), and the influence exerted on lipid metabolism was examined. The results are shown in Table 4.

TABLE 3

| Testing categories | | Test groups | | | |
|---|---|---|---|---|---|
| Supplied feed | Control group (A) | 10% wheat bran added feed | | 2% ADF added feed | |
| Measurements | Basic feed | Average ± SE | % of A | Average ± SE | % of A |
| Serum cholesterol 0 week (mg/dl) | 141 ± 4.4 | 145 ± 5.0 | 103 | 146 ± 6.2 | 104 |
| Serum cholesterol 6th week (mg/dl) | 177 ± 7.5 | 179 ± 6.9 | 101 | 132 ± 5.2 | 75 |
| Serum cholesterol 12th week (mg/dl) | 225 ± 11 | 221 ± 9.6 | 98 | 151 ± 6.3 | 67 |
| Serum neutral fats 0 week (mg/dl) | 167 ± 4.1 | 165 ± 5.7 | 99 | 164 ± 6.2 | 98 |
| Serum neutral fats 6th week (mg/dl) | 329 ± 31 | 352 ± 34 | 107 | 190 ± 15 | 58 |
| Serum neutral fats 12th week (mg/dl) | 421 ± 36 | 470 ± 41 | 112 | 254 ± 18 | 60 |
| Total liver lipids 12th week (mg/g tissue) | 79 ± 4.9 | 82 ± 3.8 | 104 | 58 ± 3.7 | 73 |
| Liver cholesterol increase 12th week (mg/g tissue) | 2.7 ± 0.1 | 2.7 ± 0.1 | 100 | 2.2 ± 0.1 | 81 |
| Body weight increase (g/rat, 12 weeks) | 335 ± 13 | 341 ± 16 | 102 | 336 ± 11 | 100 |

Note 1:
ADF derived from wheat bran
Note 2:
Average ± SE stands for the average value ± standard deviation As shown in Table 3, the serum cholesterol and neutral fat levels increase steadily for the 10% wheat bran-added group, as in the case of the control group, but the 2% wheat

TABLE 4

| Testing categories supplied feed Measurements | Control group Basic feed Average ± SE | 10% BDF-added feed Average ± SE | 5.6% soluble dietary fiber-added feed Average ± SE | 2.6% ADF-added feed Average ± SE | 2.3% cellulose-added feed Average ± SE | 0.3% lignin-added feed Average ± SE | 2.3% cellulose + 0.3% lignin-added feed Average ± SE |
|---|---|---|---|---|---|---|---|
| Serum cholesterol 0 week (mg/dl) | 154 ± 4.6 | 160 ± 5.1 | 160 ± 8.3 | 162 ± 7.4 | 159 ± 7.7 | 155 ± 6.1 | 161 ± 6.9 |
| Serum cholesterol 6th week (mg/dl) | 210 ± 8.7$^a$ | 152 ± 4.6$^b$ | 195 ± 13$^a$ | 142 ± 6.5$^b$ | 208 ± 9.6$^a$ | 212 ± 11$^a$ | 210 ± 10$^a$ |
| Serum cholesterol 12th week (mg/dl) | 235 ± 13$^a$ | 166 ± 4.5$^b$ | 223 ± 14$^a$ | 165 ± 7.6$^b$ | 230 ± 112$^a$ | 236 ± 15$^a$ | 232 ± 13$^a$ |
| Serum neutral fats 0 week (mg/dl) | 225 ± 13 | 228 ± 16 | 217 ± 20 | 221 ± 17 | 217 ± 14 | 227 ± 16 | 220 ± 15 |
| Serum neutral fats 6th week (mg/dl) | 413 ± 17$^a$ | 262 ± 15$^b$ | 339 ± 21$^{ab}$ | 264 ± 28$^b$ | 398 ± 20$^a$ | 410 ± 19$^a$ | 403 ± 21$^a$ |
| Serum neutral fats 12th week (mg/dl) | 485 ± 24$^a$ | 306 ± 19$^b$ | 448 ± 29$^a$ | 318 ± 23$^b$ | 373 ± 24$^a$ | 490 ± 31$^a$ | 381 ± 27$^a$ |

Note 1:
Water soluble dietary fiber and ADF fractionated from BDF (beet fiber). Cellulose and lignin are each separated from ADF.
Note 2:
Identical letters to the upper right of values in the same line used to indicate no statistical difference between values.

As shown in Table 4, the 10% BDF-added feed group showed a considerable blood lipid-lowering effect, as had already been confirmed by the present inventors in Japanese Patent Application SHO 62-499991 (Japanese Patent Application Disclosure SHO 63-216822), and the 2.6% BDF-derived ADF-added group also showed a considerable blood lipid-lowering effect despite the lower amount of addition, as in Experiment 1. However, the 5.6% BDF-derived water soluble dietary fiber-added group, as well as the 2.3% BDF-derived cellulose (water insoluble dietary fiber) added group and the 0.3% lignin-added group do not show these effects. Furthermore, the group for which 2.3% cellulose and 0.3% lignin were simply mixed and added does not show this effect.

These results show that the blood lipid-regulating effect of BDF depends on ADF (cellulose+lignin) and that the water soluble dietary fiber is not a contributing factor. Furthermore, the blood lipid-regulating effect of ADF is lost when cellulose and lignin are isolated each other in ADF, and since the effect does not appear even when each of the isolated cellulose and lignin are mixed, this suggests that the blood lipid-regulating effect cannot be expected when cellulose and lignin are mixed after having been isolated each other, and that it is exhibited only when both ingredients have not been isolated. It is easily understood from the above that the two ingredients, cellulose and lignin are in a bonded state in ADF.

Experiment 3

From the results of Experiments 1 and 2, the edible plant-derived dietary fiber source, wheat bran and the BDF-derived ADF were confirmed to possess specific blood lipid-regulating effects. Furthermore, for these effects, the two ingredients cellulose and lignin in ADF may not be separately isolated, but must be at least in a bonded state. In order to reconfirm the above, Experiment 3 was conducted regarding edible plant-derived dietary fiber sources, others of above described, and the results are shown in Table 5.

TABLE 5

| Testing categories supplied feed Measurements | Control group Basic feed Average ± SE | 10% SF-added feed Average ± SE | 2% SF-derived ADF-added feed Average ± SE | 10% CB-added feed Average ± SE | 2% CB-derived ADF-added feed Average ± SE | 10% AF-added feed Average ± SE | 2% AF-derived ADF-added feed Average ± SE |
|---|---|---|---|---|---|---|---|
| Serum cholesterol 0 week (mg/dl) | 134 ± 4.1 | 141 ± 3.9 | 136 ± 3.7 | 140 ± 4.0 | 137 ± 3.0 | 142 ± 4.4 | 141 ± 3.8 |
| Serum cholesterol 6th week (mg/dl) | 201 ± 8.1$^a$ | 198 ± 7.6$^a$ | 148 ± 4.8$^b$ | 190 ± 9.7$^a$ | 145 ± 4.1$^b$ | 153 ± 5.1$^b$ | 149 ± 5.2$^b$ |
| Serum cholesterol 12th week (mg/dl) | 230 ± 11$^a$ | 228 ± 9.6$^a$ | 157 ± 7.1$^b$ | 231 ± 12$^a$ | 160 ± 6.5$^b$ | 167 ± 9.8$^b$ | 161 ± 8.2$^b$ |
| Serum neutral fats 0 week (mg/dl) | 175 ± 9.4 | 181 ± 8.8 | 177 ± 10 | 172 ± 7.1 | 183 ± 11 | 174 ± 9.0 | 185 ± 9.8 |
| Serum neutral fats 6th week (mg/dl) | 364 ± 21$^a$ | 378 ± 27$^a$ | 214 ± 12$^b$ | 351 ± 19$^a$ | 230 ± 15$^b$ | 261 ± 17$^b$ | 254 ± 16$^b$ |
| Serum neutral fats 12th week (mg/dl) | 431 ± 16$^a$ | 450 ± 36$^a$ | 270 ± 13$^b$ | 442 ± 32$^a$ | 261 ± 17$^b$ | 301 ± 24$^b$ | 282 ± 20$^b$ |
| Body weight increase (g/rat, 12 weeks) | 317 ± 16 | 310 ± 15 | 308 ± 16 | 306 ± 11 | 312 ± 14 | 310 ± 13 | 320 ± 10 |

TABLE 5-continued

|  | Test groups | | | | | | |
|---|---|---|---|---|---|---|---|
| Testing categories supplied feed Measurements | Control group Basic feed Average ± SE | 10% SF-added feed Average ± SE | 2% SF-derived ADF-added feed Average ± SE | 10% CB-added feed Average ± SE | 2% CB-derived ADF-added feed Average ± SE | 10% AF-added feed Average ± SE | 2% AF-derived ADF-added feed Average ± SE |

Note 1:
ADF (cellulose + lignin) derived from SF (soybean fiber), CB (corn bran) and AF (apple fiber), with respective yields of 10%, 16% and 29%.
Note 2:
Identical letters to the upper right of values used to indicate no statistical difference between values.

In this experiment, the edible plant-derived dietary fiber sources used were soybean fiber (hereunder abbreviated to SF), corn bran (hereunder CB) and apple fiber (hereunder AF), the ADF was separated from each, rats were supplied feed containing 2% of each added to the basic feed (Table 2), and the influence exerted on lipid metabolism was examined. The results showed a significant blood lipid-lowering effect for the 10% AF-added group in comparison to the control group, but no difference between the 10% SF and 10% CB-added groups in comparison to the control. Furthermore, the 2% SF-, CB- and AF-derived ADF-added groups all showed a remarkable blood lipid-lowering effect.

These results show that the ADF of dietary fiber sources derived from edible plants which have common constituent dietary fiber ingredients possesses a definite blood lipid-regulating effect, and that edible plant-derived dietary fiber sources whose blood lipid-regulating effects had hitherto been unconfirmed had been inhibited from exhibiting those effects by ingredients (water soluble dietary fiber, non-dietary fiber ingredients) other than the ADF ingredient.

As is clear from Experiment 3, to obtain a substance having a blood lipid-regulating effect (a blood lipid regulating agent) from edible plant-derived dietary fiber sources, the dietary fiber composition thereof is important. Particularly, in the case of low dietary fiber-containing dietary fiber sources, for example, defatted rice bran, wheat bran, oat bran, soybean fiber and the like, the object of the present invention could not be achieved by using the unprocessed dietary fiber sources, since their water soluble dietary fiber and non-dietary fiber ingredients exhibit a negative effect on blood lipids. This was the same as the results from the above Experiments 1 and 2.

Experiment 4

The proportion of the constituents which express the blood lipid-regulating effect was investigated, and the results are shown in Table 6.

TABLE 6

|  |  | Test groups | | | | |
|---|---|---|---|---|---|---|
| Testing categories supplied feed Measurements | Control group Basic feed Average ± SE | 5% OB-added feed Average ± SE | 5% (1)-added feed Average ± SE | 5% (2)-added feed Average ± SE | 5% (3)-added feed Average ± SE | 5% (4)-added feed Average ± SE |
| Serum cholesterol 0 week (mg/dl) | 128 ± 3.9 | 131 ± 4.2 | 125 ± 3.0 | 130 ± 2.8 | 135 ± 3.6 | 129 ± 4.0 |
| Serum cholesterol 6th week (mg/dl) | 185 ± 12$^a$ | 191 ± 11$^a$ | 186 ± 9.8$^a$ | 180 ± 8.7$^a$ | 141 ± 4.8$^b$ | 136 ± 5.1$^b$ |
| Serum cholesterol 12th week (mg/dl) | 219 ± 14$^a$ | 221 ± 13$^a$ | 216 ± 12$^a$ | 209 ± 13$^a$ | 157 ± 7.8$^b$ | 150 ± 6.3$^b$ |
| Serum neutral fats 0 week (mg/dl) | 168 ± 9.7 | 171 ± 11 | 162 ± 8.2 | 165 ± 10 | 173 ± 11 | 167 ± 10 |
| Serum neutral fats 6th week (mg/dl) | 341 ± 19$^a$ | 357 ± 22$^a$ | 362 ± 20$^a$ | 335 ± 23$^a$ | 224 ± 16$^b$ | 230 ± 13$^b$ |
| Serum neutral fats 12th week (mg/dl) | 412 ± 25$^a$ | 425 ± 29$^a$ | 420 ± 27$^a$ | 406 ± 30$^a$ | 271 ± 19$^b$ | 265 ± 15$^b$ |

Note 1:
OB (oats bran) was alkali-decomposed under different treatment conditions to prepare (1), (2), (3) and (4). The ADF contents of OB, (1), (2), (3) and (4) were 8%, 24%, 41%, 50% and 76%, respectively.
Note 2:
Identical letters to the upper right of values in the same line used to indicate no statistical difference between values.

In this experiment, low dietary fiber-containing oat bran (hereunder abbreviated to OB) was used, and the influence on lipid metabolism of OB-derived dietary fibers with different ADF contents was examined. The OB-derived dietary fibers with different ADF contents were obtained by varying the alkali concentration and treatment time for alkali decomposition (normal temperature, using a caustic soda solution), and following the decomposition with neutralization, washing and drying. The result, as shown in Table 6, was a strengthening of the lowering effect on blood lipids as the OB-derived ADF content increased, while the dietary fibers with low ADF contents exhibited no such effect. From the result of this experiment, it is clear that dietary fibers which exhibit a blood lipid-regulating effect require an ADF content of 50% or greater.

Experiment 5

In this experiment, oat bran (OB) obtained by acid treatment instead of alkali treatment as in Experiment 4 was added to the supplied feed to 5%, and its influence on the lipid metabolism of rats was examined. The results are shown in Table 7. The acid treatment method was effected by subjecting the OB to treatment with a 0.5N sulfuric acid solution at 70° C. for 30 minutes and neutralization with a caustic soda solution, followed by washing and drying. The ADF content of the product of this acid treatment was 62.7%.

TABLE 7

| Testing categories Supplied feed Measurements | Control group Basic feed Average ± SE | Test groups | |
|---|---|---|---|
| | | 5% OB-added feed Average ± SE | 5% (5)-added feed Average ± SE |
| Serum cholesterol 0 week (mg/dl) | 124 ± 2.8 | 127 ± 2.6 | 128 ± 3.0 |
| Serum cholesterol 6th week (mg/dl) | 176 ± 10.1$^a$ | 175 ± 9.8$^a$ | 134 ± 4.1$^b$ |
| Serum cholesterol 12th week (mg/dl) | 208 ± 13.2$^a$ | 210 ± 14.3$^a$ | 146 ± 5.4$^b$ |
| Serum neutral fats 0 week (mg/dl) | 157 ± 8.9 | 161 ± 9.2 | 159 ± 8.8 |
| Serum neutral fats 6th week (mg/dl) | 304 ± 16.7$^a$ | 312 ± 15.0$^a$ | 198 ± 10.3$^b$ |
| Serum neutral fats 12th week (mg/dl) | 405 ± 20.1$^a$ | 421 ± 22.4$^a$ | 237 ± 13.9$^b$ |

Note 1:
(5) was obtained by acid treatment of OB, and the ADF content thereof was 62.7%.
Note 2:
Identical letters to the upper right of values in the same line used to indicate no statistical difference between values.

TABLE 8

| (%) | Dietary fiber ingredient | | | Other ingredients | | | |
|---|---|---|---|---|---|---|---|
| | Cellulose | Lignin | Hemicellulose | Water contents | Crude protein | Crude liped | Ash |
| Wheat bran | 9.5 | 2.7 | 31.6 | 6.5 | 17.4 | 5.2 | 5.1 |
| Product of the invention | 48.4 | 13.9 | 14.0 | 5.8 | 4.7 | 3.1 | 2.6 |

As shown in Table 7, the product obtained by the acid treatment showed a considerable blood lipid-lowering effect, similar to the alkali-treated product in Experiment 4. From this it was discovered that, irrespective of the acid or alkali treatment, the ADF obtained from edible plant-derived dietary fiber possesses an effect of lowering blood lipids.

Thus, since both the ADF in the alkali-treated oat bran in Experiment 4 and the ADF in the acid-treated oat bran in Experiment 5 exhibited blood lipid-lowering effects, it was understood that the two ingredients cellulose and lignin in the ADF were in a bonded state, as in the ADF in Experiments 1, 2 and 3.

An agent for the suppressing or lowering of blood lipids, cholesterol or neutral fats according to the present invention may be easily produced by treating a plant-derived dietary fiber source with an alkali or acid solution, as described, for example, in Experiments 4 and 5. Also, since an agent for lowering cholesterol, etc. according to the present invention exhibits its effect when the content of ADF is 50% or greater, as shown in Experiment 4, the effective amount thereof must be 50% or greater. In addition, because the agent uses natural edible plants or raw plant substances which are safe or are rendered safe, it is completely safe for humans.

EXAMPLE 1

10 kg of commercially available wheat bran powder (composition listed in Table 7) and 120 liters of a 0.5N-caustic soda solution were placed in a 200 liter stirring tank, and were stirred at 50° C. for 24 hours. The stirred powdered granules were subjected to compression dehydration using a nylon cloth, and the dehydrated granules were mixed with 80 liters of tap water and the mixture was adjusted to pH 6.5 with a 1N-hydrochloric acid solution. The pH-adjusted granules were subjected to compression dehydration, and then washing with tap water and compression dehydration was repeated 3 times, to obtain 10.2 kg of powdered granules with a water content of 82%. The granules were air-dried at 70° C. until the water content reach to about 5%, and then they were pulverized with a hammer mill and sieved out to obtain 1.94 kg of powdered granules of particle size 0.25mm or lower (hereunder referred to as the product of the invention). The composition of the product of the invention is as shown in Table 8, and contains 48.4% cellulose and 13.9% lignin.

EXAMPLE 2

Twenty-one 4-week-old rats were divided into 3 groups (7 rats each), Group 1 was given the basic feed (Table 2), Group 2 was given a feed consisting of the basic feed plus 10% wheat bran, and Group 3 was given a feed consisting of the basic feed plus 4% of the product of the present invention obtained in Example 1, and the rats were fed for 12 weeks without interruption. At the beginning of the experiment, at the 6th week and at the 12th week, blood was taken from the caudal vein, and the levels of cholesterol and neutral fats in the serum were determined. Also, on the 12th week the livers were extracted, and the total lipid and cholesterol contents in the liver were determined. The results are shown in Table 9.

As shown in Table 9, the group with the product of the invention added showed a significant suppression of serum lipid elevation, and a suppression of total lipid accumulation in the liver, in comparison to the basic feed group and the 10% wheat bran-added group. None of the groups showed a difference in body weight increase at 12 weeks.

TABLE 9

| Testing categories Supplied feed Measurements | Control group Basic feed Average ± SE | Test groups | |
|---|---|---|---|
| | | 10% wheat bran-added feed Average ± SE | 4% product of the invention-added feed Average ± SE |
| Serum cholesterol 0 week (mg/dl) | 126.4 ± 3.86 | 125.0 ± 2.90 | 130.2 ± 3.17 |
| Serum cholesterol 6th week (mg/dl) | 171.2 ± 6.04$^a$ | 169.8 ± 5.81$^a$ | 132.4 ± 4.60$^b$ |
| Serum cholesterol 12th week (mg/dl) | 218.0 ± 9.52$^a$ | 215.4 ± 8.80$^a$ | 142.3 ± 5.32$^b$ |
| Serum neutral fats 0 week (mg/dl) | 154.2 ± 5.11 | 157.0 ± 6.20 | 151.4 ± 5.46 |
| Serum neutral fats 6th week (mg/dl) | 318.0 ± 26.6$^a$ | 334.2 ± 31.2$^a$ | 195.0 ± 18.4$^b$ |
| Serum neutral fats 12th week (mg/dl) | 379.3 ± 34.5$^a$ | 401.0 ± 37.1$^a$ | 220.6 ± 20.7$^b$ |
| Total liver lipids 12th week (mg/g tissue) | 71.2 ± 4.16$^a$ | 75.3 ± 5.28$^a$ | 54.9 ± 4.21$^b$ |
| Liver cholesterol 12th week (mg/g tissue) | 2.81 ± 0.12$^a$ | 2.69 ± 0.14$^a$ | 2.18 ± 0.10$^b$ |
| Body weight increase (g/rat, 12 weeks) | 329.1 ± 12.6 | 331.4 ± 14.2 | 325.8 ± 13.1 |

TABLE 9-continued

|  | Test groups | | |
| --- | --- | --- | --- |
| Testing categories Supplied feed Measurements | Control group Basic feed Average ± SE | 10% wheat bran-added feed Average ± SE | 4% product of the invention-added feed Average ± SE |

Note:
Identical letters to the upper right of values used to indicate no statistical difference between values.

TABLE 10

| | Plasma cholesterol levels (mg/dl) | |
| --- | --- | --- |
| Subject | At the beginning of the administration | 30 days after the administration |
| Male A | 254 | 217 |
| Male B | 281 | 235 |

EXAMPLE 3

To each of two males exhibiting hypercholesterolemia, a 39-year-old male A (height 174 cm, weight 75 kg) and a 52-year-old male B (height 163 cm, weight 81 kg), was provided for ingestion 4 g of the product of the invention obtained in Example 1, three times a day before meals, and this was continued for 30 days. During this time, there were absolutely no restrictions placed on the content of the meals or eating between meals, and meals were at regular times. Here, the amount of ingestion of the wheat bran-derived product of the invention was approximately 7.5 g per day. The plasma cholesterol levels before ingestion of the product of the invention and 30 days thereafter were as shown in Table 10, and for both males A and B, a decrease in plasma cholesterol levels was observed due to ingestion of the product of the invention.

As mentioned above, by ingestion of an agent according to the present invention for the suppression or lowering of blood lipids, cholesterol and neutral fats comprising, as an effective ingredient, an edible dietary fiber derived from plants which contains cellulose and lignin as its main constituents and maintains the cellulose and lignin in a bonded state as in the plant, it is possible to contribute to the support of human health (support of normal levels of blood lipids).

I claim:

1. A method for lowering or suppressing cholesterol and neutral fat levels in the bloodstream comprising administering to a subject a blood cholesterol neutral fat lowering or suppressing effective amount of a composition comprising an isolated, purified edible dietary fiber which is derived from a plant and which comprises cellulose and lignin compounds as its major substituents, wherein 50% or more of said lignin and cellulose compounds are bound together in the same manner that these compounds are bound in a native plant material.

2. The method of claim 1 wherein said edible dietary fiber is produced by treating an edible dietary fiber containing plant material with an alkali or an acid under conditions which provide for the substantial removal of the water soluble dietary fiber materials and non-dietary fiber materials but which do not substantially denature the bonds between the lignin and cellulose compounds.

3. The method of claim 2 wherein the method for producing the edible dietary fiber further comprises neutralizing the resultant alkali-treated or acid-treated plant material.

4. The method of claim 1 wherein 70% or more of said lignin and cellulose compounds are bound together in the same manner by which these compounds are bound in a native plant material.

5. The method of claim 4 wherein 80% or more of said lignin and cellulose compounds are bound together in the same manner that these compounds are bound in a native plant material.

6. The method of claim 5 wherein 90% or more of said lignin and cellulose compounds are bound together in the same manner that these compounds are bound in a native plant material.

7. The method of claim 1 wherein said edible dietary fiber is derived from a plant material selected from the group consisting of rice, wheat, oats, corn, soybean, apple, tangerine, celery, spinach, banana, Chinese cabbage, mushroom, mugwort, osmund and dandelion.

8. The method of claim 1 wherein said edible dietary fiber is produced by treating an edible dietary fiber containing plant material with an alkali or an acid under conditions which provide for the substantial removal of the water soluble dietary fiber materials and non-dietary fiber materials but which do not denature the bonds between the lignin and cellulose compounds.

9. The method of claim 8 wherein the method for producing the edible dietary fiber further comprises neutralizing the resultant alkali-treated or acid treated plant material.

10. The method of claim 1 wherein the dietary fiber containing composition is administered orally.

* * * * *